United States Patent [19]

McNicol

[11] Patent Number: 4,977,580
[45] Date of Patent: Dec. 11, 1990

[54] TIMING AND CARRIER RECOVERY IN TDMA WITHOUT PREAMBLE SEQUENCE

[75] Inventor: John D. McNicol, Nepean, Canada

[73] Assignee: Northern Telecom Limited, Montreal, Canada

[21] Appl. No.: 256,958

[22] Filed: Oct. 13, 1988

[30] Foreign Application Priority Data

Aug. 15, 1988 [CA] Canada .................................. 5748815

[51] Int. Cl.⁵ ............................................... H04J 3/16
[52] U.S. Cl. ..................................... 375/97; 370/95.3; 375/111
[58] Field of Search ....................... 375/77, 80, 81, 83, 375/86, 97, 15, 39, 106, 111; 329/304, 308; 370/95.3, 100.1, 104.1; 455/31, 33, 34, 38

[56] References Cited

U.S. PATENT DOCUMENTS

| | | | |
|---|---|---|---|
| 3,792,364 | 2/1974 | Ananias | 375/77 |
| 4,794,341 | 12/1988 | Barton et al. | 329/304 |
| 4,852,090 | 7/1989 | Borth | 375/101 |
| 4,866,739 | 9/1989 | Agazzi et al. | 375/106 |

OTHER PUBLICATIONS

J. G. Proakis; "Digital Communications", 1983, pp. 202–203, McGraw—Hill, Inc.

Primary Examiner—Benedict V. Safourek
Attorney, Agent, or Firm—Jean-Pierre Fortin

[57] ABSTRACT

The present invention provides a method of detecting the clock rate and recovering the carrier in a TDMA (time division multiple access) signal. The quadrature baseband components are stored for a predetermined amount of time as sampled data and the clock phase error of the baseband samples are estimated. The clock phase of the baseband samples are corrected from the estimated clock phase error by using interpolation over the sampled quadrature components. The carrier phase error of the stored baseband time corrected quadrature samples are then estimated and the carrier phase is corrected according to the estimated phase error. The corrected clock and carrier signals are then forwarded to decision circuit means for providing demodulated data.

16 Claims, 7 Drawing Sheets

TIMING AND CARRIER RECOVERY IN TDMA WITHOUT PREAMBLE SEQUENCE

FIELD OF THE INVENTION

This invention relates to mobile radio systems and more particularly to the time division multiple access (TDMA) class of systems.

BACKGROUND OF THE INVENTION

In the TDMA class of mobile radio systems, several users share one carrier. Each user is allocated a separate time slot on that carrier, and each transmits and receives short bursts of data packets separated by a guard time. A typical TDMA burst starts with a preamble. The preamble consists of bit timing and carrier recovery information, equalizer initialization data FEC (forward error correction), decoder synchronization and other overhead if needed. This is typically followed by a start flag, a control field, a data field, a CRC (cyclic redundancy check) and an end flag. The number of users on one carrier is limited to the number of slots allocated for that particular carrier. The problem associated with the use of clock and carrier training sequences (preambles or midambles) is that they increase the bit frame overhead and they reduce transmission efficiency.

There is a requirement for minimizing the bit overhead of the frame while maintaining a reliable data signal for error free transmission. Accordingly, an object of the present invention is to minimize the frame overhead allocated to clock and carrier training sequences (preambles or midambles). Another object of the present invention is to minimize signal processing load while maintaining signal integrity and reliability.

SUMMARY OF THE INVENTION

According to a first aspect of the present invention, there is provided a method of detecting the clock phase and recovering the carrier of a TDMA signal in the absence of clock and carrier training preambles, comprising the steps of: (a) storing for a predetermined amount of time, digitally sampled quadrature baseband components of said TDMA signal; (b) estimating the clock phase error of said quadrature baseband components; (c) correcting the clock phase of said baseband components from the estimated clock phase error using interpolation over said digitally sampled quadrature components; (d) storing for a predetermined amount of time, said quadrature baseband components having a corrected clock phase; (e) estimating the carrier phase error of said clock phase corrected quadrature baseband components; (f) correcting the carrier phase of said clock phase corrected quadrature baseband components according to said estimated carrier phase error; and (g) forwarding said clock/carrier phase corrected quadrature baseband components to decision circuit means for providing demodulated data and to frame detection circuit means for providing a start frame reference signal.

According to a second aspect of the present invention, there is provided a system for detecting the clock phase and recovering the carrier of a TDMA signal in the absence of clock and carrier training preambles, comprising: (a) first storing means for storing digitally sampled quadrature baseband components of said TDMA signal for a predetermined amount of time; (b) means for estimating the clock phase error of said quadrature baseband components; (c) means for correcting the clock phase of said baseband components from the estimated clock phase error using interpolation over said digitally sampled quadrature components; (d) second storing means for storing said quadrature baseband components having a corrected clock phase for a predetermined amount of time; (e) means for estimating the carrier phase error of said clock phase corrected quadrature baseband components; (f) means for correcting the carrier phase of said clock phase corrected quadrature baseband components according to said estimated carrier phase error; (g) decision circuit means for providing demodulated data from said clock/carrier phase corrected quadrature baseband components; and (h) frame detection circuit means for providing a start frame reference signal.

DESCRIPTION OF THE DRAWINGS

Particular embodiments of the invention will be understood in conjunction with the accompanying drawings, in which:

FIG. 3b is a block diagram of the second section of the Baseband Processing Circuit of FIG. 3a;

DESCRIPTION OF THE PREFERRED EMBODIMENT

Figure 1A:
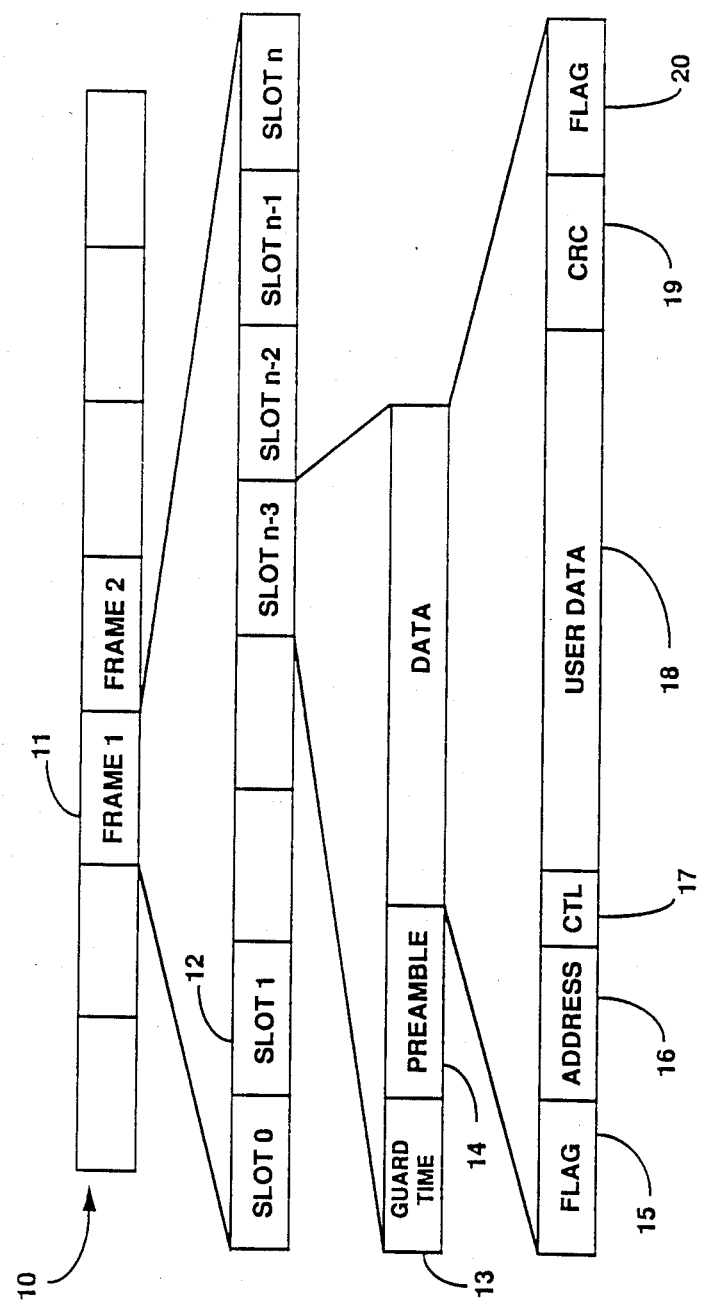
FIG. 1a is an illustration of a typical TDMA frame.

Referring now to FIG. 1a, we have shown generally at reference numeral 10, a typical TDMA frame representation. The TDMA carrier is divided into a series of contiguous frames 11 and slots 12. As is shown, each frame is comprised of n number of slots. Each user on the carrier is assigned one or more slots. The transmission commences at the start of the slot and is completed before the end of that slot. The size and number will of course depend on the application.

A typical TDMA burst is separated from an adjacent burst by a guard time 13 and starts with a preamble 14. The preamble consists of bit timing and carrier recovery information, equalizer initialization data, FEC (forward error correction), decoder synchronization and other overhead if needed. This is followed by a start flag 15, an address field 16, a control field 17, a user data field 18, a CRC (cyclic redundancy check) 19 and an end flag 20.

Figure 1B:
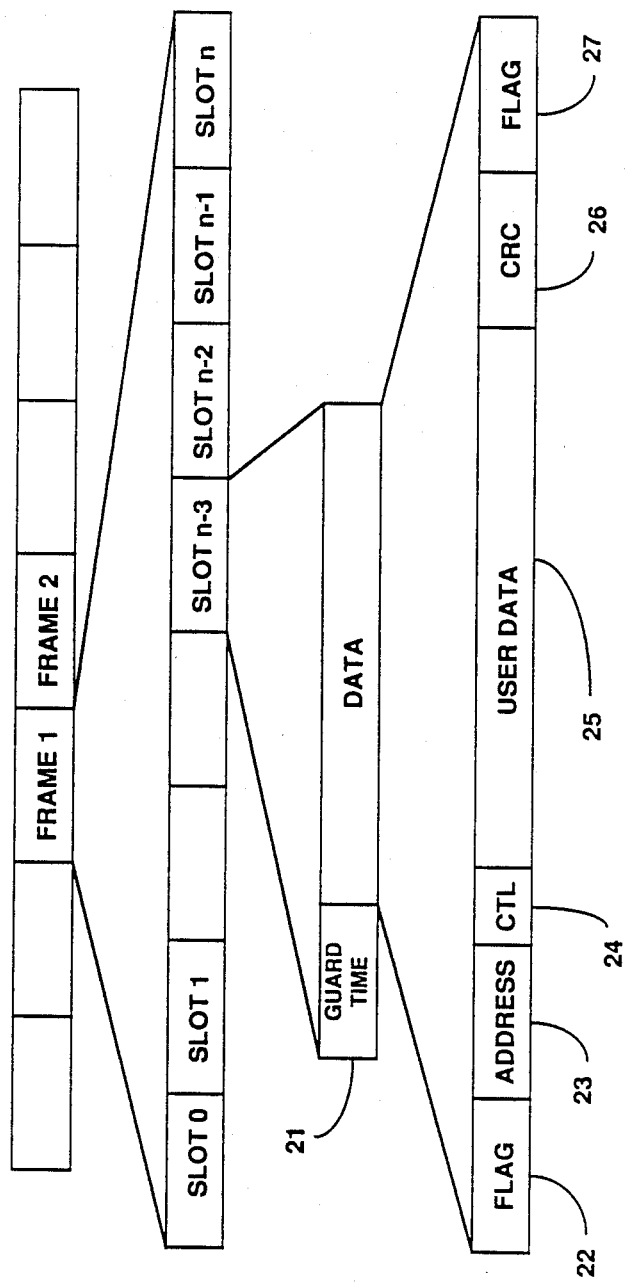
FIG. 1b is an illustration of a TDMA frame as can be used in the present invention.

If we now refer to FIG. 1b, we have shown a TDMA frame proposed for use with the present invention. In this representation, the overhead allocated to the clock and carrier training preambles has been deleted. Only the guard time 21 separates each burst. Each burst would similarly have a start flag 22 for synchronization purposes and could consist of a Barker code, an address field 23, a control field 24, a user data field 25, a CRC 26 and an end flag 27. A signal having this representation can be recovered and demodulated as will be described below.

Figure 2:
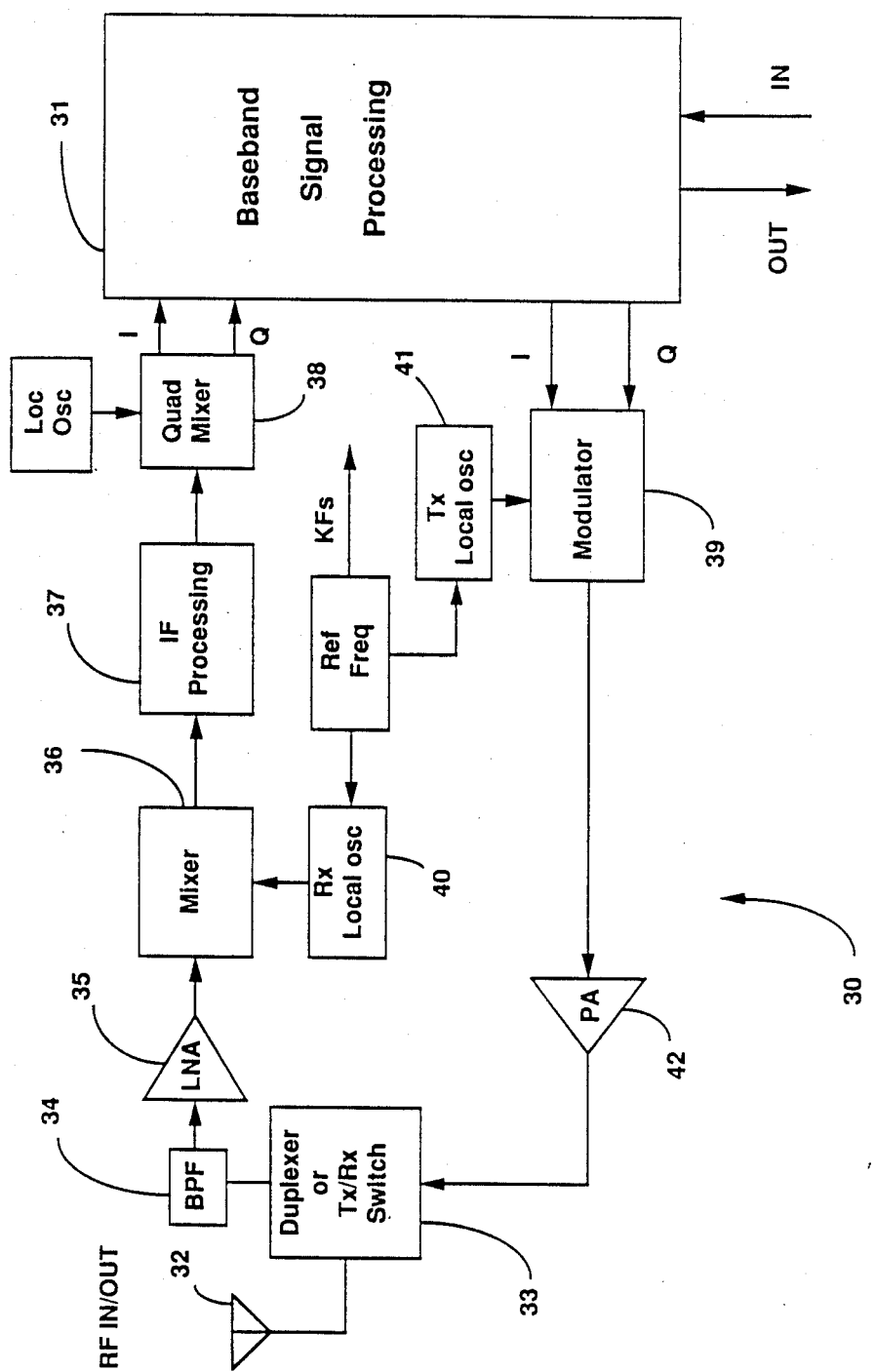
FIG. 2 is a block diagram of a typical TDMA mobile radio system.

FIG. 2 is a block diagram of a typical receiver used in mobile radio systems which would include a front end section and a baseband processing circuit. This front end is shown generally at reference numeral 30 and the baseband processing circuit at reference numeral 31. The front end 30 is basically comprised of a receiving and transmitting antenna 32 connected to a duplexer or transmit/receive switch 33. The received signal first enters a band pass filter 34 to provide some extra transmitter image rejection in the receiver. The filtered signal is then fed through a typical low noise amplifier 35 before being down-converted to an IF by mixer 36. At the IF processing stage 37, the signal is filtered to remove some of the out-of-band unwanted signals and amplified before being mixed down to baseband by quad mixer 38. At this point, two quadrature baseband components are recovered, namely the I-phase signal and the Q-phase signal processed at circuit 31.

At the transmitter section, the I and Q signals first filtered to remove the out of band frequencies (not shown) before being up-converted by modulator 39. The mixer 36 and modulator 39 are frequency locked to the same reference frequency by synthesizers 40 and 41. These synthesizers can consist of a dielectric resonator VCO as the RF signal source controlled by a synthesizer IC in a phase locked loop. The Q channel is mixed with the 90° phase RF carrier, while the I channel is mixed with in-phase RF carrier. The RF mixer outputs are combined and the resultant waveform is fed to the power amplifier 42. A PIN diode attenuator (not shown) can be used to control the transmit power level into the power amplifier 42. The power amplifier output is fed to duplexer or transmit/receive switch 33 which is used to combine transmitter and receiver signals at the antenna terminal.

Figure 3A:
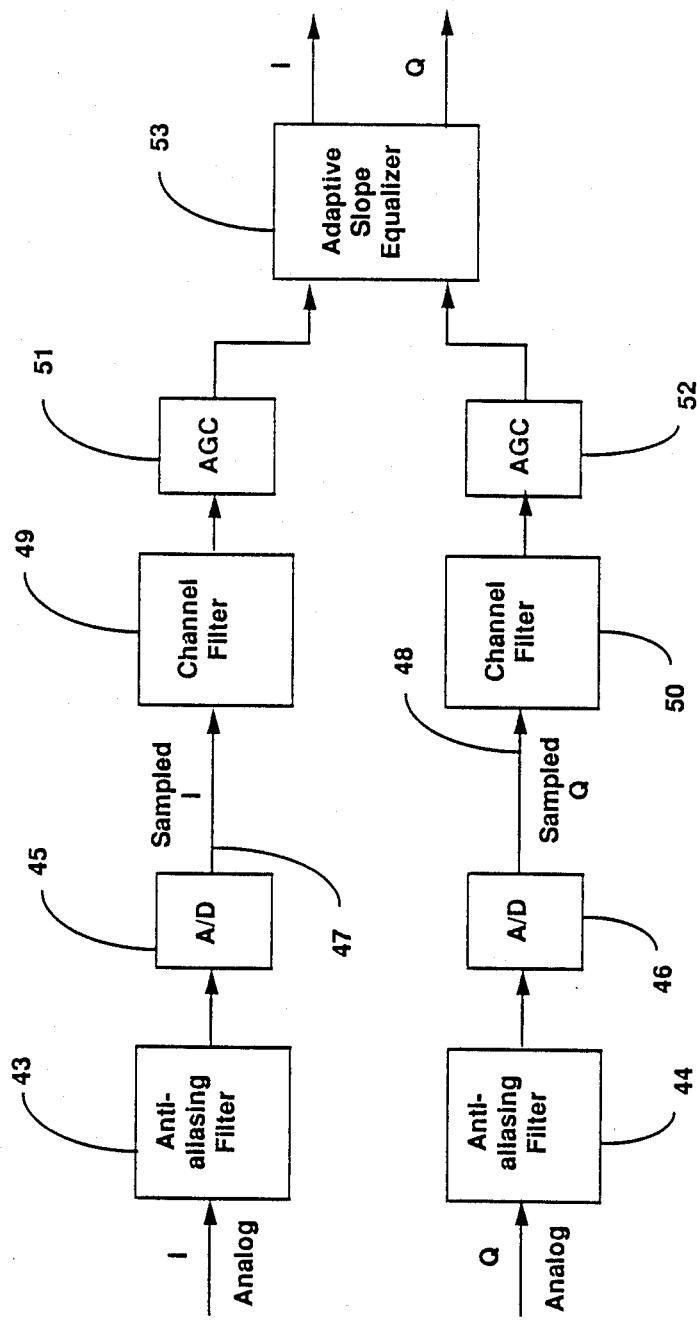
FIG. 3a is a block diagram of a first stage of a Baseband Processing Circuit according to an embodiment of the present invention.

If we now refer to FIG. 3a, we have shown the first stage of the baseband processing circuit shown in FIG. 2. The two quadrature signals, namely I and Q, that have been recovered from quad mixer 38 of FIG. 2, can then be amplified before being low pass filtered by filters 43 and 44 respectively, to remove high frequency that can cause aliasing distortion. The respective signals are then digitally sampled by A/D converters 45 and 46. The baseband digital signals 47 and 48 are then digitally filtered by channel filters 49 and 50 respectively to achieve the required adjacent channel performance and to remove out-of-band energy and intersymbol interference. A constant signal level is maintained by means of automatic gain control circuits 51 and 52. An adaptive slope equalizer 53 may be used to obtain a relatively constant frequency/power response across the channel bandwidth for enhanced performance.

Figure 3B:
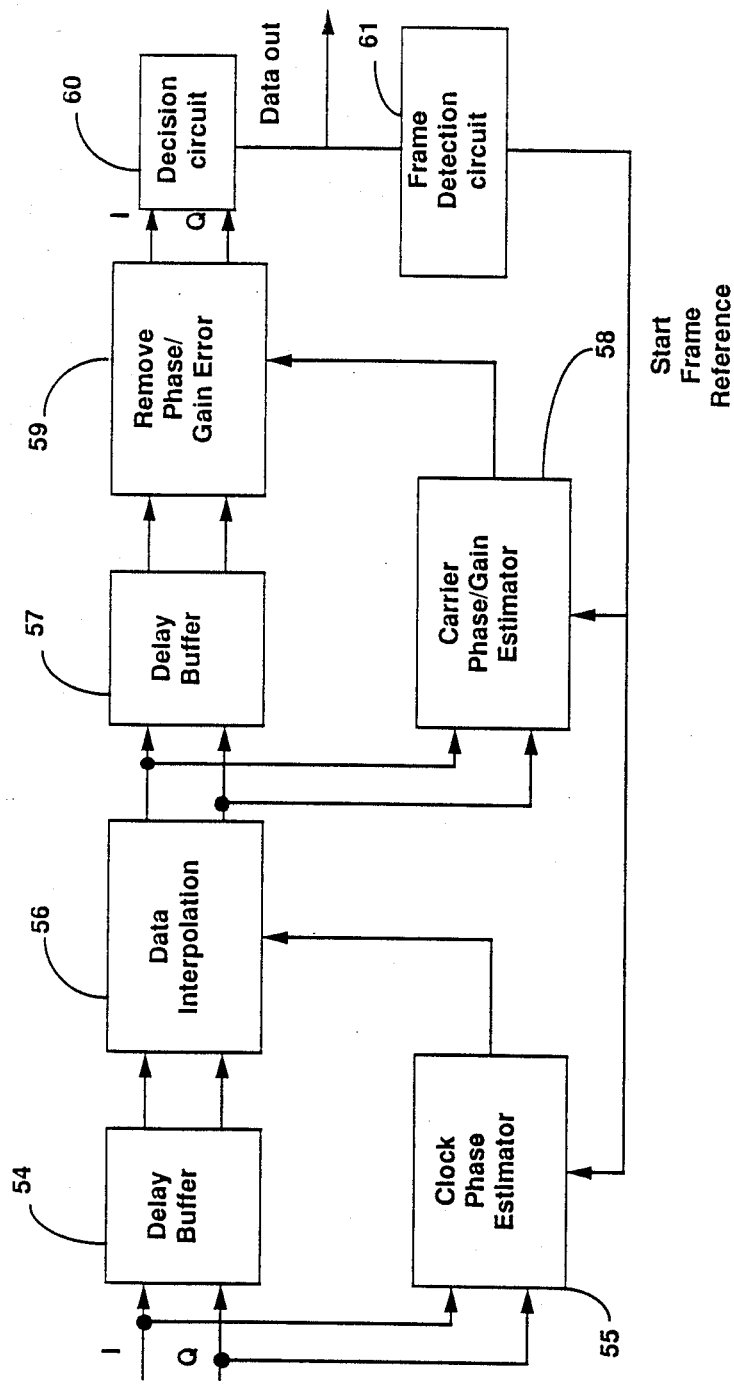

In FIG. 3b, we have shown the second stage of the baseband processing circuit of FIG. 2. The second stage provides the timing and carrier recovery of the frame. As indicated, no overhead is allocated to clock and carrier training preambles. Instead, the baseband quadrature signal components are stored as sampled data in delay buffers while the clock and carrier phase are estimated. There are advantages if the entire slot is stored. A receiver assigned n slots per frame has an interval equal to the frame duration divided by n to process each slot. This can allow the signal processing circuit to operate with a lower clock rate which may be advantageous. In addition, the processing may be non-causal. Averaging can be done forwards and backwards.

This stage is comprised of a first delay buffer 54 for storing the digitized samples received, a clock phase estimator 55 providing an estimate of the clock phase error to a data interpolation circuit 56. Delay buffer 57 provides additional time to process the time recovered samples at the carrier phase/gain estimator 58 which will provide a carrier phase/gain error estimate to correction circuit 59 the output of which is connected to a decision circuit 60.

Figure 4:
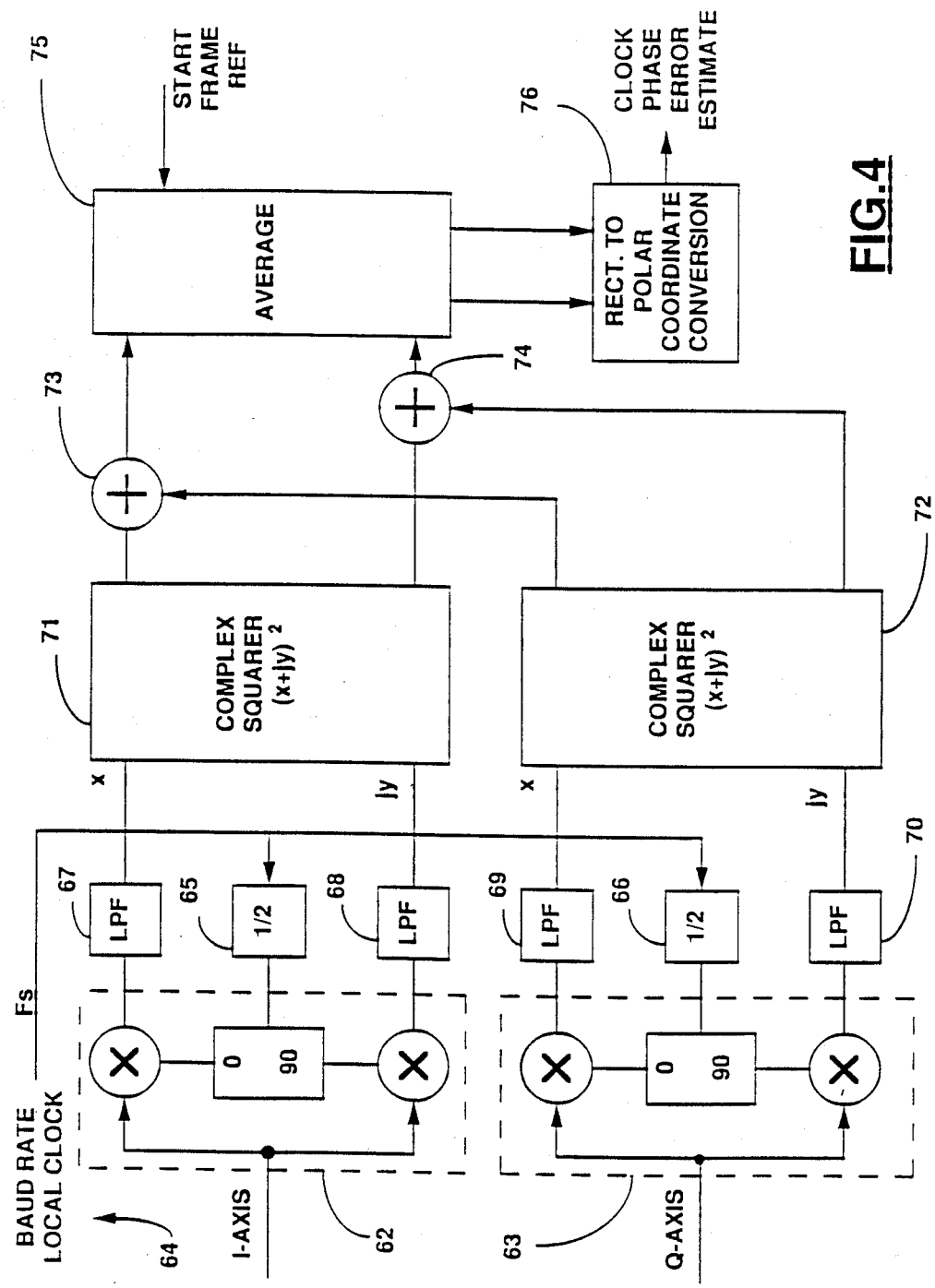
FIG. 4 is a block diagram of the Clock Phase Estimator of FIG. 3b.

In FIG. 4, we have shown a block diagram of an implementation of the clock phase error estimator of FIG. 3b. In this embodiment, the clock is recovered using a Costas loop applied to the filtered baseband signals on one or both axes. This clock has a harmonic relationship to the baud rate fs/n where fs is the baud rate and n is greater than or equal to 1. Circuits 62 and 63 are used to process the sampled I and Q baseband signals by the reference clock signal 64 via divide-by-two circuits 65 and 66. The real and imaginary components x and y respectively for each axis are filtered by means of low pass filters 67, 68 and 69, 70 respectively. The results are then squared by means of squaring circuits 71 and 72 for removing the 180 degree phase ambiguity. The resultant real and imaginary signals from each axes are then summed at 73 and 74 for improved accuracy and then averaged at 75 over the burst and further processed at rectangular-to-polar conversion circuit 76 to give the estimated clock phase error. One embodiment of circuit 76 is a table look-up circuit implemented in a ROM in which the input is address information and the output is a set of coefficients for a finite impulse filter. These coefficients are used in circuit 56, the data interpolation circuit in an FIR (finite impulse response) filter to recover a sequence of I and Q samples with the correct clock phase. The start frame reference signal is used here to initiate the clock recovery process. The estimated clock phase error is used in conjunction with the clock interpolation circuit 56 shown in FIG. 3b to interpolate the correctly timed data from the stored samples in delay buffer 54. The results are T/n-spaced sampled data for the I and Q axes where n is greater than or equal to 1. These samples are sent to a decision circuit 60, the output of which is the demodulated data. The demodulated data is also input to the frame detection circuit 61 which provides a start frame reference signal for the entire process. The decision circuit could be a simple threshold detector on the I and Q axes or an adaptive equalizer (decision feedback, Viterbi, etc.). It will be understood by those knowledgeable in this art that the input and output rates of the clock recovery circuit may or may not be the same.

Figure 5:
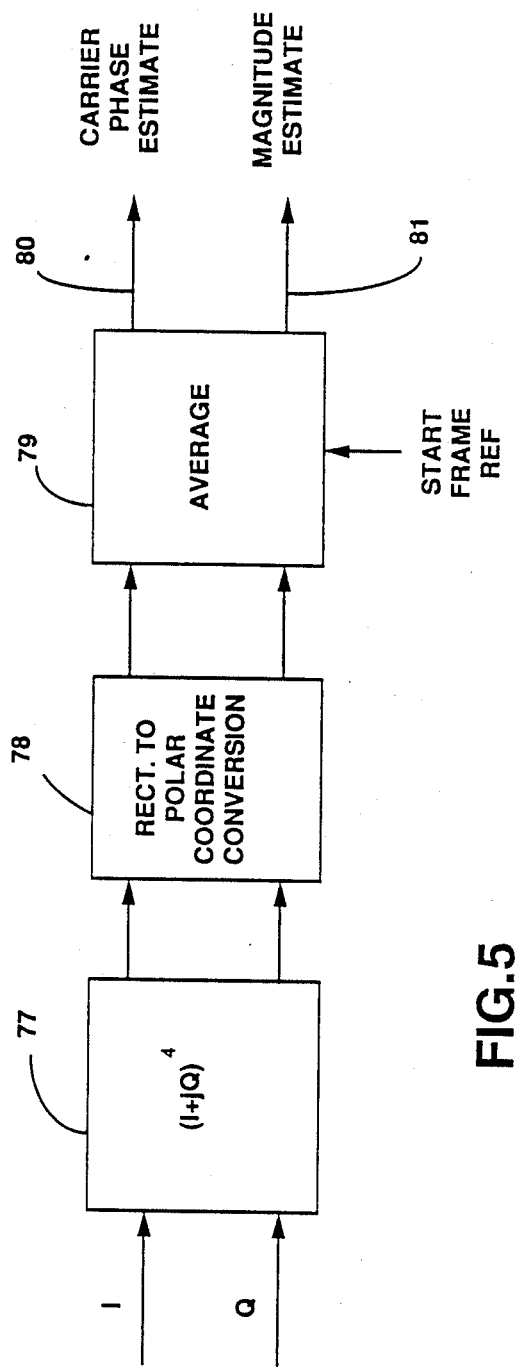
FIG. 5 is a block diagram of the Carrier Phase Estimator of FIG. 3b.

FIG. 5 is a block diagram of an implementation of the carrier phase and magnitude estimator of FIG. 3b. The carrier measurement includes raising the I and Q baseband samples to the mth-power for m-PSK modulation at circuit 77 to account for four quadrant carrier phase ambiguity. The signals can then be converted at circuit 78 to provide a polar coordinate before being averaged at circuit 79, providing a carrier phase estimate 80 and a magnitude estimate 81. These are applied to circuit 59 of FIG. 3b to restore symbols back to their proper locations. It will be understood by those knowledgeable in the art that a magnitude correction would not be required if an AGC circuit was used in this instance.

What is claimed is:

1. A method of detecting the clock phase and recovering the carrier of a TDMA signal in the absence of clock and carrier training preambles, comprising the steps of:

(a) storing for a predetermined amount of time, digitally sampled quadrature baseband components of said TDMA signal;

(b) estimating the clock phase error of said quadrature baseband components;

(c) correcting the clock phase of said baseband components from the estimated clock phase error using interpolation over said digitally sampled quadrature comprising:

(d) storing for a predetermined amount of time, said quadrature baseband components having a corrected clock phase;

(e) estimating the carrier phase error of said clock phase corrected quadrature baseband components;

(f) correcting the carrier phase of said clock phase corrected quadrature baseband components according to said estimated carrier phase error; and (g) forwarding said clock/carrier phase corrected quadrature baseband components to decision circuit means for providing demodulated data and to frame detection circuit means for providing a start frame reference signal.

2. A method as defined in claim 1 wherein said clock phase error is estimated by:

multiplying the baseband components with a half symbol clock rate and a 90° phase shifted half symbol clock rate, to obtain real and imaginary segments of each baseband component;

filtering the real and imaginary segments of each baseband component;

squaring said real and imaginary segments to remove phase ambiguity;

summing the resultant real and imaginary segments from each baseband; and averaging to provide said clock phase error estimate.

3. A method as defined in claim 2 wherein, said carrier phase error is estimated by:

applying a fourth-power complex multiplication to said clock phase corrected quadrature baseband components; and averaging the resultant signal over a clock burst to provide said carrier phase error estimate.

4. A method as defined in claim 3 wherein said carrier phase is recovered by using said carrier phase error estimate to restore the samples to their proper I and Q locations.

5. A method as defined in claim 4, further comprising the steps of:

(g) estimating the carrier magnitude error of said clock phase corrected quadrature baseband components; and (h) correcting the carrier magnitude of said clock phase corrected quadrature baseband components according to said estimated carrier magnitude error.

6. A method as defined in claim 5 wherein said carrier magnitude error is estimated by:

applying a fourth-power complex multiplication to said clock phase corrected quadrature baseband components; and averaging the resultant signal over a clock burst to provide said carrier magnitude error estimate.

7. A method as defined in claim 6 wherein said carrier magnitude is recovered by using said carrier magnitude error estimate to restore the samples to their proper I and Q locations.

8. A method of detecting the clock phase and recovering the carrier of a TDMA signal in the absence of clock and carrier training preambles, comprising the steps of:

(a) storing for a predetermined amount of time digitally sampled quadrature baseband components of said TDMA signal;

(b) estimating the clock phase error of said quadrature baseband components;

(c) correcting the clock phase of said baseband components from the estimated clock phase error using interpolation over said digitally sampled quadrature baseband components;

(d) estimating the carrier phase error and the magnitude error of said clock phase corrected quadrature baseband components;

(e) correcting the carrier phase and magnitude of said clock phase corrected quadrature baseband components according to said estimated phase and magnitude error; and (f) forwarding said corrected clock and carrier signals to decision circuit means for providing demodulated data and to frame detection circuit means for providing a start frame reference signal.

9. A method as defined in claim 8 wherein said clock phase error is estimated by:

multiplying the baseband components with a half symbol clock rate and a 90° phase shifted half symbol clock rate, to obtain real and imaginary segments of each baseband component;

filtering the real and imaginary segments of each baseband component;

squaring said real and imaginary segments to remove phase ambiguity;

summing the resultant real and imaginary segments from each baseband; and averaging to provide said clock phase error estimate.

10. A method as defined in claim 9 wherein, said carrier phase and magnitude error are estimated by applying a fourth-power complex multiplication to said clock phase corrected quadrature baseband components; and averaging the resultant signal over a clock burst to provide said carrier phase and magnitude error estimates.

11. A method as defined in claim 10 wherein said carrier phase and magnitude are recovered by using said carrier phase and magnitude error estimates to restore the samples to the true I and Q position.

12. A system for detecting the clock phase and recovering the carrier of a TDMA signal in the absence of clock and carrier training preambles, comprising:

(a) first storing means for storing digitally sampled quadrature baseband components of said TDMA signal for a predetermined amount of time;

(b) means for estimating the clock phase error of said quadrature baseband components;

(c) means for correcting the clock phase of said baseband components from the estimated clock phase error using interpolation over said digitally sampled quadrature components;

(d) second storing means for storing said quadrature baseband components having a corrected clock phase for a predetermined amount of time;

(e) means for estimating the carrier phase error of said clock phase corrected quadrature baseband components;

(f) means for correcting the carrier phase of said clock phase corrected quadrature baseband components according to said estimated carrier phase error;

(g) decision circuit means for providing demodulated data from said clock/carrier phase corrected quadrature baseband components; and (h) frame detection circuit means for providing a start frame reference signal.

13. A system as defined in claim 12, wherein said clock phase error estimating means comprises:

means for multiplying the baseband components with a half symbol clock rate and a 90° phase shifted half symbol clock rate, to obtain real and imaginary segments of each baseband component;

means for filtering the real and imaginary segments of each baseband component;

means for squaring said real and imaginary segments to remove phase ambiguity;

means for summing the resultant real and imaginary segments from each baseband; and means for averaging to provide said clock phase error estimate.

14. A system as defined in claim 13, wherein said carrier phase estimating means comprises:

means for applying a fourth-power complex multiplication to said clock phase corrected quadrature baseband components; and means for averaging the resultant signal over a clock burst to provide said carrier phase error estimate.

15. A system as defined in claim 14, further comprising:

(g) means for estimating the carrier magnitude error of said clock phase corrected quadrature baseband components; and (h) means for correcting the carrier magnitude of said clock phase corrected quadrature baseband components according to the estimated carrier magnitude error.

16. A system as defined in claim 15, wherein said carrier magnitude error estimating means, comprises:

means for applying a fourth-power complex multiplication to said clock phase corrected quadrature baseband components; and means for averaging the resultant signal over a clock burst to provide said carrier magnitude error estimate.

* * * * *